United States Patent
Ma et al.

(10) Patent No.: US 8,693,522 B2
(45) Date of Patent: Apr. 8, 2014

(54) PILOT SENDING METHOD AND APPARATUS

(75) Inventors: Jie Ma, Beijing (CN); Chuanfeng He, Beijing (CN); Huan Zhou, Beijing (CN); Liang Xia, Beijing (CN); Yue Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/481,412

(22) Filed: May 25, 2012

(65) Prior Publication Data

US 2012/0236909 A1    Sep. 20, 2012

Related U.S. Application Data

(63) Continuation of application No. PCT/CN2010/079104, filed on Nov. 25, 2010.

(30) Foreign Application Priority Data

Nov. 25, 2009    (CN) .......................... 2009 1 0246767

(51) Int. Cl.
*H04B 1/00*    (2006.01)

(52) U.S. Cl.
USPC ........... 375/141; 375/135; 375/136; 375/260; 375/267; 375/347; 375/349; 375/299

(58) Field of Classification Search
USPC ......... 375/141, 135, 136, 260, 267, 347, 349, 375/299
See application file for complete search history.

(56) References Cited

U.S. PATENT DOCUMENTS

| | | | |
|---|---|---|---|
| 7,983,236 B2 | 7/2011 | Rinne et al. | |
| 2005/0020237 A1* | 1/2005 | Alexiou et al. | 455/403 |
| 2007/0195865 A1* | 8/2007 | Joetten et al. | 375/148 |
| 2008/0219374 A1* | 9/2008 | Fernandez-Corbaton et al. | 375/267 |
| 2009/0075686 A1 | 3/2009 | Gomadam et al. | |
| 2010/0046445 A1 | 2/2010 | Sawahashi et al. | |
| 2010/0220814 A1* | 9/2010 | Wu et al. | 375/308 |

FOREIGN PATENT DOCUMENTS

| | | |
|---|---|---|
| CN | 1829114 A | 9/2006 |
| CN | 101039294 A | 9/2007 |
| CN | 101299634 A | 11/2008 |
| CN | 101313548 A | 11/2008 |

(Continued)

OTHER PUBLICATIONS

Extended European Search Report in corresponding European Patent Application No. 10832659.6 (Sep. 19, 2012).

(Continued)

*Primary Examiner* — Kabir A Timory
(74) *Attorney, Agent, or Firm* — Leydig, Voit & Mayer, Ltd.

(57) ABSTRACT

Embodiments of the present invention provide a pilot sending method and an apparatus, which relate to the communication field and can save network resources. The solution is: performing spreading on at least two signature sequences by using a spreading code, where each signature sequence of the at least two signature sequences corresponds to at least one user equipment (UE), and is used as a dedicated pilot of at least one data stream of the at least one UE, and the dedicated pilot is used by the UE to perform precoding matrix estimation; and performing precoding on the spread signature sequences, and sending the precoded spread signature sequences to the UE. The embodiments of the present invention are applicable to the sending of pilots in MU-MIMO.

7 Claims, 6 Drawing Sheets

(56) References Cited

FOREIGN PATENT DOCUMENTS

| | | |
|---|---|---|
| CN | 101317340 A | 12/2008 |
| CN | 101330486 A | 12/2008 |
| CN | 101473555 A | 7/2009 |
| JP | 2008079262 A | 4/2008 |
| JP | 2009273186 A | 11/2009 |
| WO | WO 2008023646 A1 | 2/2008 |
| WO | WO 2008041080 A2 | 4/2008 |
| WO | WO 2011013072 A2 | 2/2011 |

OTHER PUBLICATIONS

Chinese Search Report in corresponding Chinese Patent Application No. 200910246767.1 (Aug. 7, 2012).

International Search Report in corresponding International Patent Application No. PCT/CN2010/079104 (Mar. 3, 2011).

Written Opinion of the International Searching Authority in corresponding International Patent Application No. PCT/CN2010/079104 (Mar. 3, 2011).

* cited by examiner

1

PILOT SENDING METHOD AND APPARATUS

CROSS-REFERENCE TO RELATED APPLICATIONS

This application is a continuation of International Application No. PCT/CN2010/079104, filed on Nov. 25, 2010, which claims priority to Chinese Patent Application No. 200910246767.1, filed on Nov. 25, 2009, both of which are hereby incorporated by reference in their entireties.

FIELD OF THE INVENTION

The present invention relates to the communication field, and in particular, to a pilot sending method and an apparatus.

BACKGROUND OF THE INVENTION

With the development of communication technologies, a lot of new technologies emerge, where a very typical one is CoMP (Coordinated Multi-point Transmission, coordinated multi-point transmission). Among various types of CoMP, MU-MIMO (Multi User Multi Input Multi Output, multi user multi input multi output) has the most significant gain.

A basic goal of the MU-MIMO is to increase an average data rate of users, and perform precoding for spatially-separated antennas "collaboratively" by sharing a data stream, so as to implement optimized communication with multiple user equipments. In the MU-MIMO, a transmitter performs different precoding on data of different users, and then sends the precoded data by using the spatially-separated antennas. Receivers of different users performs decoding on the received data to obtain their respective data. The MU-MIMO eliminates mutual interference between different users through precoding, and achieves a purpose of sending data to multiple users at the same time.

A user needs to know a code book used by a network side or a precoding matrix formed by using the code book, so that decoding and obtaining the data can be performed. Therefore, the network side needs to send a precoding matrix index or a pilot sequence to each user. Because different data streams of different users adopt different code books, the network side needs to send the precoding matrix index or the pilot sequence to the users.

In the prior art, a large number of precoding matrix indexes are sent, which occupies a lot of resources.

SUMMARY OF THE INVENTION

Embodiments of the present invention provide a pilot sending method and an apparatus, which can save network resources.

To solve the foregoing technical problem, the embodiments of the invention adopt the following technical solutions:

A pilot sending method includes:
performing spreading on at least two signature sequences by using a spreading code; and
performing precoding on the spread signature sequences, and sending the precoded spread signature sequences to a UE;
where each signature sequence of the at least two signature sequences is used as a dedicated pilot of at least one data stream of at least one UE, and the dedicated pilot is used by the UE to perform precoding matrix estimation; and
where a precoding matrix used in performing the precoding is the same as a precoding matrix used in performing precoding on data streams corresponding to the signature sequences; or a precoding vector used in performing the precoding is the same as a coding vector used in performing precoding on data streams corresponding to the signature sequences.

A method for performing estimation by using dedicated pilots includes:
receiving, by a user equipment (UE), dedicated pilots sent by a network side;
performing descrambling on the dedicated pilots;
performing, according to a spreading code of the received dedicated pilots, despreading on the received dedicated pilots, and obtaining dedicated pilots that belong to different data streams; and
obtaining a precoding matrix or calculating a composite channel matrix by using the received dedicated pilots and signature sequences sent by the network side, where the composite channel matrix is a product of a channel matrix of all receive antennas of the UE and a precoding matrix of all data streams of the UE.

A base station device includes:
a spreading unit, configured to perform spreading on at least two signature sequences by using a spreading code, where each signature sequence of the at least two signature sequences corresponds to at least one user equipment (UE), and is used as a dedicated pilot of at least one data stream of the at least one UE, and the dedicated pilot is used by the UE to perform precoding matrix estimation;
a precoding unit, configured to perform precoding on sequences output by the spreading unit, where a precoding matrix or a precoding vector, where the precoding matrix or the precoding vector is used in performing the precoding, is the same as a precoding matrix or a precoding vector, where the precoding matrix or the precoding vector is used in performing precoding on data streams corresponding to the signature sequences; and
a sending unit, configured to send sequences output by the precoding unit to the UE.

A user equipment includes:
a receiving unit, configured to receive dedicated pilots sent by a network side;
a descrambling unit, configured to perform descrambling on the dedicated pilots received by the receiving unit;
a despreading unit, configured to perform, according to a spreading code of the received dedicated pilots, despreading on the received dedicated pilots, and obtain dedicated pilots that belong to different data streams; and
a calculating unit, configured to obtain a precoding matrix or calculate a composite channel matrix by using the received dedicated pilots and signature sequences sent by the network side, where the composite channel matrix is a product of a channel matrix of all receive antennas of the user equipment and a precoding matrix of all data streams of the user equipment.

By using the pilot sending method and the apparatus provided in the embodiments of the present invention, multiple signature sequences are carried on a same spreading code, and are used as dedicated pilots of multiple data streams of multiple UEs, so that the UEs estimate a precoding matrix used by a multi-antenna sender. By using the pilot sending method and the apparatus provided in the embodiments of the present invention, a precoding matrix index of each data stream of each UE does not need to be sent to the UE, which saves network resources and avoids occurrence of circumstances where a UE cannot perform decoding normally because a large number of precoding matrix indexes of users cannot be notified at the same time.

BRIEF DESCRIPTION OF THE DRAWINGS

To describe the technical solutions in the embodiments of the present invention or in the prior art more clearly, accompanying drawings that need to be used in the description of the embodiments or the prior art are briefly introduced below. Evidently, the accompanying drawings in the following description are only some embodiments of the present invention, and persons of ordinary skill in the art may further obtain other drawings according to these accompanying drawings without creative efforts.

DETAILED DESCRIPTION OF THE EMBODIMENTS

The technical solutions in the embodiments of the present invention are described clearly and completely below with reference to the accompanying drawings in the embodiments of the present invention. Apparently, the embodiments to be described are only part of rather than all of the embodiments of the present invention. Based on the embodiments of the present invention, all other embodiments obtained by persons of ordinary skill in the art without making creative efforts shall fall within the protection scope of the present invention.

Figure 1:
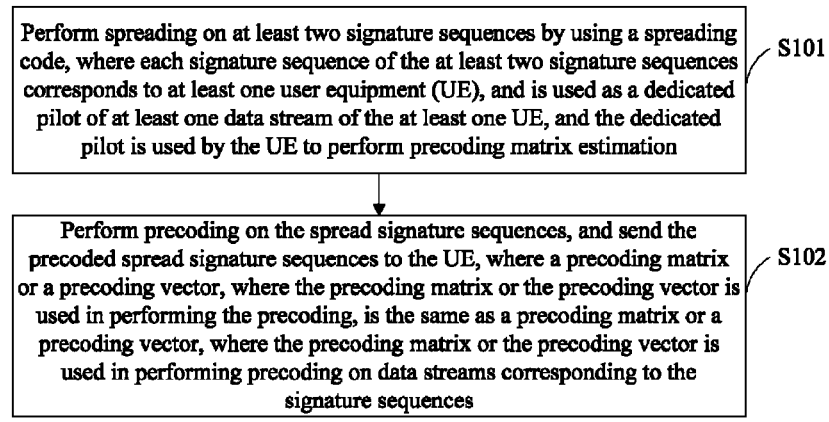
FIG. 1 is a block flowchart of a pilot sending method according to an embodiment of the present invention.

A first embodiment of the present invention provides a pilot sending method, which is as shown in FIG. 1.

S101: Perform spreading on at least two signature sequences by using a spreading code, where each signature sequence of the at least two signature sequences corresponds to at least one user equipment (UE), and is used as a dedicated pilot of at least one data stream of the at least one UE, and the dedicated pilot is used by the UE to perform precoding matrix estimation.

That is, the dedicated pilot of at least one data stream of the at least one UE may share a physical channel.

S102: Perform precoding on the spread signature sequences, and send the precoded spread signature sequences to the UE, where a precoding matrix or a precoding vector, where the precoding matrix or the precoding vector is used in performing the precoding, is the same as a precoding matrix or a precoding vector, where the precoding matrix or the precoding vector is used in performing precoding on data streams corresponding to the signature sequences.

Precoding may be performed on the dedicated pilots and the data streams at the same time, that is to say, a starting timeslot of each TTI (Transmission Time Interval, transmission time interval) of a dedicated pilot channel may be aligned with a starting timeslot of a data channel. A dedicated pilot, after being precoded in a same way as the data channel of a certain TTI, may also be sent several timeslots before data transmission time of the TTI. That is to say, the starting timeslot of each TTI of the dedicated pilot channel may be several timeslots earlier than a starting timeslot of a corresponding TTI of the data channel.

Further, before multi-antenna transmission for the UE is performed, a network side may notify the UE of the dedicated pilot and/or the spreading code of the dedicated pilot through an RRC (Radio Resource Control, radio resource control) message. In this case, if the signature sequences are preset at a UE side, only an indication of the signature sequences may be carried in the RRC signaling. Certainly, specific content of the signature sequences may also be sent. Similarly, for the spreading code, the spreading code may also be preset at the UE side, and only an indication of the spreading code is carried in the RRC signaling, or content of the spreading code is directly sent in the RRC signaling.

The RRC message, for example, may include a radio bearer reconfiguration message, a radio bearer setup message, a physical layer reconfiguration message, or an RRC connection setup message.

By using the pilot sending method provided in this embodiment of the present invention, multiple signature sequences are carried on a same spreading code, and are used as dedicated pilots of multiple data streams of multiple UEs, so that the UEs estimate a precoding matrix used by a multi-antenna sender. In this way, a precoding matrix index of each data stream of each UE does not need to be sent to the UE, which avoids occurrence of circumstances where a UE cannot perform decoding normally in the prior art because a large number of precoding matrix indexes of users cannot be notified at the same time. According to the embodiments of the present invention, network resources are saved, and the number of accessing users is effectively increased. In addition, the dedicated pilot of each data stream of each UE does not need to occupy a dedicated downlink DPCCH (Dedicated Physical Control Channel, dedicated physical control channel). Because each DPCCH needs to consume at least one spreading code, if the dedicated pilot of each data stream of each UE consumes at least one spreading code, the shortage of spreading code resources is caused to get worse. Therefore, carrying the dedicated pilots of multiple data streams of multiple UEs on one spreading code can save code resources and serve more users.

Figure 2:
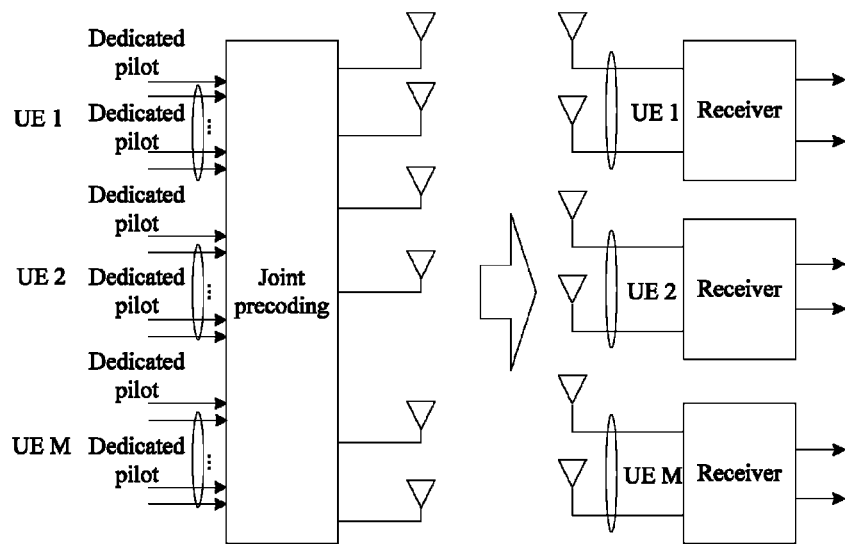
FIG. 2 is a schematic flowchart of adding dedicated pilots at a transmitter in MU-MIMO according to an embodiment of the present invention.
Figure 3:
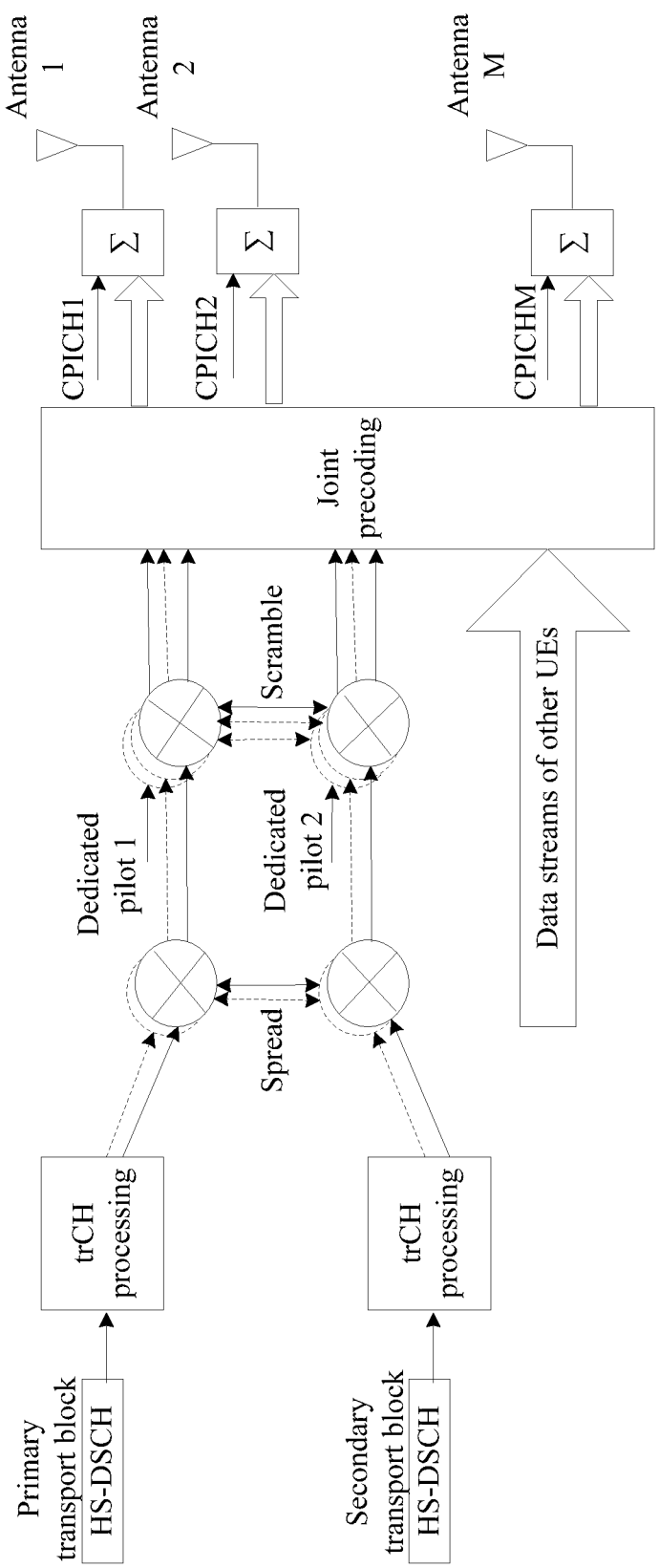
FIG. 3 is a schematic diagram of a process of adding a dedicated pilot for one UE according to an embodiment of the present invention.

In a pilot sending method provided in a second embodiment of the present invention, when a NodeB sends a data stream, the NodeB performs precoding on each data stream and a corresponding dedicated pilot together, and sends the precoded data stream and dedicated pilot to a UE. FIG. 2 shows a process of adding dedicated pilots at a transmitter in MU-MIMO. In FIG. 2, a process of adding dedicated pilots for one UE is as shown in FIG. 3. Assume that the UE has two data streams, and that a starting timeslot of each TTI of a dedicated pilot channel is aligned with a starting timeslot of each TTI of a data channel.

In this embodiment of the present invention, spreading is performed on all dedicated pilots, that is, dedicated pilots of different data streams for different UEs, by sharing a same spreading code. Certainly, multiple spreading codes may also be used to perform spreading, but more resources can be saved if only one spreading code is used.

Specifically, one signature sequence corresponds to a data stream of one UE, is used as a dedicated pilot of the data stream of the UE, and is used to perform precoding matrix estimation. The signature sequences may be, for example, the sequences shown in Table 1:

TABLE 1

Orthogonal signature sequences

| | | | | | | | | | | | | | | | | | | | |
|---|---|---|---|---|---|---|---|---|---|---|---|---|---|---|---|---|---|---|---|
| $C_{55,40,0}$ | −1 | −1 | −1 | 1 | −1 | 1 | −1 | −1 | 1 | 1 | −1 | −1 | 1 | −1 | 1 | 1 | −1 | 1 | 1 | −1 |
| $C_{55,40,1}$ | −1 | 1 | 1 | −1 | −1 | 1 | 1 | 1 | −1 | −1 | 1 | −1 | 1 | 1 | −1 | −1 | −1 | −1 | 1 | 1 |
| $C_{55,40,2}$ | −1 | −1 | −1 | 1 | −1 | 1 | 1 | 1 | −1 | −1 | −1 | 1 | −1 | 1 | 1 | 1 | −1 | −1 | 1 | 1 |
| $C_{55,40,3}$ | 1 | −1 | −1 | −1 | −1 | −1 | −1 | 1 | 1 | 1 | −1 | 1 | −1 | 1 | −1 | 1 | −1 | −1 | 1 | 1 |
| $C_{55,40,4}$ | 1 | 1 | 1 | −1 | −1 | 1 | −1 | 1 | −1 | −1 | 1 | 1 | 1 | −1 | 1 | 1 | 1 | 1 | 1 | 1 |
| $C_{55,40,5}$ | −1 | 1 | −1 | −1 | 1 | 1 | 1 | −1 | 1 | 1 | −1 | 1 | 1 | −1 | 1 | 1 | 1 | −1 | −1 |
| . . . | | | | | | | | | | | | | | | | | | | | |
| $C_{55,40,0}$ | −1 | −1 | −1 | −1 | −1 | −1 | −1 | 1 | −1 | 1 | −1 | −1 | 1 | 1 | 1 | 1 | 1 | −1 | −1 | −1 |
| $C_{55,40,1}$ | 1 | −1 | −1 | −1 | −1 | 1 | −1 | −1 | −1 | −1 | −1 | −1 | 1 | 1 | −1 | 1 | 1 | −1 | −1 |
| $C_{55,40,2}$ | 1 | −1 | 1 | 1 | 1 | −1 | 1 | 1 | 1 | −1 | 1 | −1 | −1 | −1 | −1 | −1 | −1 | 1 | −1 |
| $C_{55,40,3}$ | −1 | 1 | −1 | 1 | 1 | −1 | 1 | −1 | 1 | 1 | −1 | 1 | −1 | 1 | −1 | −1 | 1 | −1 | −1 |
| $C_{55,40,4}$ | −1 | 1 | 1 | 1 | −1 | −1 | −1 | 1 | 1 | −1 | 1 | −1 | 1 | 1 | 1 | −1 | 1 | −1 | 1 | −1 |
| $C_{55,40,5}$ | 1 | −1 | −1 | 1 | −1 | 1 | −1 | 1 | −1 | −1 | 1 | −1 | 1 | −1 | −1 | −1 | −1 | 1 | 1 | −1 |
| . . . | | | | | | | | | | | | | | | | | | | | |

Before multi-antenna transmission is performed, a network side needs to notify the UE of information related to the dedicated pilots through an RRC message, where the information related to the dedicated pilots may include, for example, signature sequences and/or a spreading code of the signature sequences. Certainly, if the UE knows the signature sequences and/or the spreading code in advance, only indication information of the signature sequences and/or indication information of the spreading code may be carried here.

The RRC message may be a radio bearer reconfiguration message, a radio bearer setup message, a physical layer reconfiguration message, or an RRC connection setup message, and so on. Specific information element formats in the RRC message may be shown in Table 2.

TABLE 2

Specific information element formats of the RRC message

| Information Element Name | Mandatory or Not | Value Range | Information Element Type and Reference Value |
|---|---|---|---|
| Channelization code | Mandatory | | Integer (0 . . . 127) |
| Dedicated pilot list | Mandatory | 1 to <the largest number of data streams> | |
| >Signature sequence | Mandatory | | Integer (0 . . . 39) |

When receiving precoded dedicated pilot sequences, the UE needs to perform descrambling first, and then performs despreading according to the spreading code of the received dedicated pilots to obtain dedicated pilot signals that are superimposed and belong to different data streams. The network side already notifies the UE of the used dedicated pilots, or a UE side already stores the dedicated pilots used by the UE, and each dedicated pilot is orthogonal and does not affect each other. Therefore, the UE may obtain a precoding matrix or calculate a composite channel matrix by using the received dedicated pilots and known signature sequences, where the composite channel matrix is a product of a channel matrix of all receive antennas of the UE and a precoding matrix of all data streams of the UE.

The following takes a specific example for description:

Assume that H is a channel matrix of all receive antennas of one UE, and is an m×n matrix, where m indicates the number of receive antennas of the UE, and n indicates the number of transmit antennas of the NodeB. Assume that W is a precoding matrix of all data streams of the UE, and is an n×s matrix, where n indicates the number of transmit antennas of the NodeB, and s indicates the number of data streams of the UE. Pilot data received by all antennas of the UE may be represented as follows:

$$P_{receive} = H_{m \times n} W_{n \times s} P_{s \times 1} + N$$

$P_{receive}$ indicates a received pilot sequence sent by the network side, and N indicates interference and superimposed noise of dedicated pilots of data streams of other UEs. If a good channel space orthogonality exists between each UE of the MU-MIMO, mutual interference can be minimized after precoding. In addition, because the dedicated pilots are mutually orthogonal, and do not interfere with each other, N may be ignored in the process of obtaining the precoding matrix. $H_{m \times n}$ may be estimated by the UE through common pilot measurement of each antenna. $P_{s \times 1}$ indicates a dedicated pilot that the network side notifies to the UE, and the precoding matrix $W_{n \times s}$ is obtained through calculation; or, the precoding matrix $W_{n \times s}$ may also be obtained by polling all precoding matrices.

Or, the UE does not need to obtain the precoding matrix $W_{n \times s}$ specifically, but obtains the composite channel matrix $H_{m \times n} W_{n \times s}$ through calculation, and then decodes a signal by using $H_{m \times n} W_{n \times s}$.

A process of decoding a received signal by the UE is as follows:

Assume that a received data signal is $S_{receive} = H_{m \times n} W_{n \times s} S_{s \times 1} + N_s$.

Then, a process of performing decoding by the UE is:

$$W^H H^H S_{receive} = W^H H^H HWS + W^H H^H N_s = \begin{bmatrix} \lambda_1 & \cdots & 0 \\ \vdots & \ddots & \vdots \\ 0 & \cdots & \lambda_n \end{bmatrix} S + N'_s$$

That is, the composite channel matrix $H_{m \times n} W_{n \times s}$ multiplied by a signal S is changed into a diagonal matrix by using the decoding matrix $W^H H^H$.

The decoding matrix $W^H H^H = (HW)^H$ is used in the decoding.

Therefore, the UE does not need to obtain the precoding matrix $W_{n \times s}$ specifically, but only needs to obtain $H_{m \times n} W_{n \times s}$ to implement the decoding.

Assume that a received pilot signal is $P_{receive} = H_{m \times n} W_{n \times s} P_{s \times 1} + N$, where $H_{m \times n} W_{n \times s}$ is a m×s matrix, which is set to $$\begin{bmatrix} A_{11} & \cdots & A_{1s} \\ \vdots & \ddots & \vdots \\ A_{m1} & \cdots & A_{ms} \end{bmatrix}.$$

In this case, the data received by all antennas is:

$$\begin{bmatrix} P_{receive\_Ant1} \\ \vdots \\ P_{receive\_Antm} \end{bmatrix} = \begin{bmatrix} A_{11} & \cdots & A_{1s} \\ \vdots & \ddots & \vdots \\ A_{m1} & \cdots & A_{ms} \end{bmatrix} \begin{bmatrix} P_1 \\ \vdots \\ P_m \end{bmatrix} + N$$

Data received by each antenna is decoded by using orthogonal dedicated pilots of different data streams, and all elements in a matrix A may be obtained.

By using the pilot sending method provided in this embodiment of the present invention, multiple signature sequences are carried on a same spreading code, and are used as dedicated pilots of multiple data streams of multiple UEs, so that the UEs estimate a precoding matrix used by a multi-antenna sender. In this way, a precoding matrix index of each data stream of each UE does not need to be sent to the UE, which avoids occurrence of circumstances where a UE cannot perform decoding normally in the prior art because a large number of precoding matrix indexes of users cannot be notified at the same time. According to the embodiments of the present invention, network resources are saved, and the number of accessing users is effectively increased. In addition, the dedicated pilot of each data stream of each UE does not need to occupy a dedicated downlink DPCCH. Because each DPCCH needs to consume at least one spreading code, if the dedicated pilot of each data stream of each UE consumes at least one spreading code, the shortage of spreading code resources is caused to get worse. Therefore, carrying the dedicated pilots of multiple data streams of multiple UEs on one spreading code can save code resources and serve more users.

A third embodiment of the present invention provides a pilot sending method, and its process is similar to that in the second embodiment.

The difference is that: If a space orthogonality between UEs is good enough, that is, if a correlation coefficient of channel matrices or channel vectors of multiple UEs is smaller than a first threshold, and an eigenvector of a channel matrix of one UE of multiple UEs exists in a precoding code book or a correlation coefficient with a precoding code book is greater than a second threshold, no interference or only small interference exists between the UEs. Therefore, one spreading code is used to perform spreading on at least two signature sequences, where each signature sequence corresponds to at least one data stream of at least two UEs, and is used as a dedicated pilot of the at least two UEs to perform precoding matrix estimation. That is, a dedicated pilot used in one UE may be reused in another UE, so as to further reduce dedicated pilot overheads and increase the number of accessing users. In addition, the precoding code book mentioned here refers to vectors or precoding vectors in the precoding matrix in the second embodiment.

To implement reusing of the dedicated pilots between UEs, it is needed that a network side pays attention to the foregoing features when selecting a paired (grouping) UE of MU-MIMO. When a very proper UE pair (group) compliant with the foregoing space orthogonality and code book occurs, a same dedicated pilot may be applied to different UEs in this UE group.

A pilot information delivering manner still complies with an RRC manner in the second embodiment, while the UE is transparent in the whole process. That is, the UE itself does not know that there are other UEs which use a same dedicated pilot as that it uses. Therefore, for all signal receiving and processing steps, reference may be made to the foregoing embodiments.

The following gives description by taking an example that two UEs are paired in the channel orthogonality.

Assume that a data stream sent to a UE1 is an S1, a channel through which the S1 passes is an H1, and a precoding matrix is a W1.

Assume that a data stream sent to a UE2 is an S2, a channel through which the S2 passes is an H2, and a precoding matrix is a W2.

Therefore, a signal received by the UE1 is $H_1 W_1 S_1$; a signal received by the UE2 is $H_2 W_2 S_2$; interference of data of the UE2 on the UE1 is $H_1 W_2 S_2$; and interference of data of the UE1 on the UE2 is $H_2 W_1 S_1$.

The channel H1 may be represented by $H_1 = V_1 D_1 V_1^H$, where V1 indicates an eigenvector of the H1, and V1, for example, may be a unitary matrix satisfying $V_1 V_1^H = I$, D1 indicates a diagonal matrix, and I indicates a unit matrix. Generally, a precoding matrix of the UE1 is $W_1 = V_1$.

Similarly, the channel H2 may be represented by $H_2 = V_2 D_2 V_2^H$. This equation is substituted into the interference of the data of the UE1 on the UE2, and the following is obtained: $H_2 W_1 S_1 = V_2 D_2 V_2^H W_1 S_1 = V_2 D_2 V_2^H V_1 S_1$.

Because an orthogonality between the UE1 and the UE2 is good, it indicates that $V_2^H V_1 = 0$ or $< \epsilon$.

It can be known from the foregoing that, because a channel orthogonality between the UE1 and the UE2 is good, interference between the data of the UE1 and the data of the UE2 is 0 approximately, that is, interference between two paired UEs is very small. Certainly, another prerequisite is that the eigenvector exists in the precoding code book.

A fourth embodiment of the present invention provides a pilot sending method, and its process is similar to that in the second embodiment. The difference is that: If there are only a few precoding code books, that is, if the number of precoding code books is smaller than a third threshold, a same pilot sequence may be used in different data streams of a same UE, that is, one spreading code is used to perform encoding on at least two signature sequences, where each signature sequence corresponds to at least two data streams of one UE, is used as a dedicated pilot of at least two data streams of the UE, and is used to perform precoding matrix estimation. In addition, the precoding code book mentioned here refers to vectors or precoding vectors in the precoding matrix in the second embodiment.

For a same dedicated pilot, the UE needs to estimate a channel matrix H by adopting a method of polling and trying all precoding code books, and substitute different precoding code books sent by a network side into the following equation:

$$H_{m \times n} W_{n \times s} P$$

It is determined that a calculation result of a precoding code book is closest to received pilot data, and the precoding code book is a precoding code book used by a NodeB.

In this way, through the reusing of the dedicated pilot, dedicated pilot overheads can be further reduced, and the number of accessing users is increased.

Figure 4:
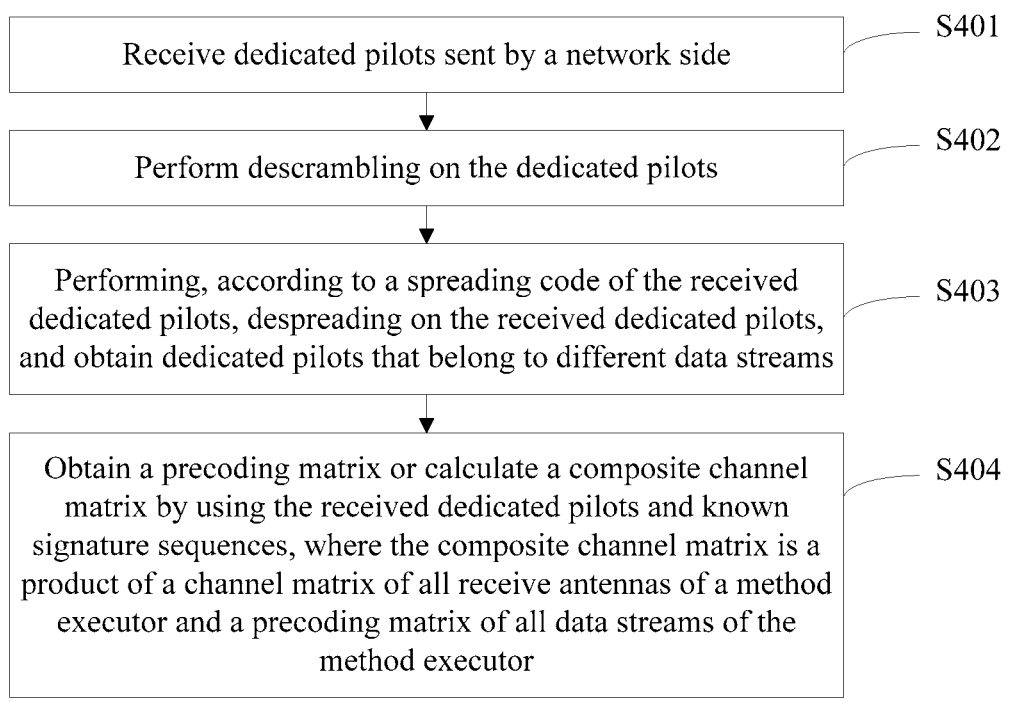
FIG. 4 is a block flowchart of a method for performing estimation by using dedicated pilots according to an embodiment of the present invention.

An embodiment of the present invention provides a method for performing estimation by using dedicated pilots. As shown in FIG. 4, the method includes the following steps:

S401: Receive dedicated pilots sent by a network side.

S402: Perform descrambling on the dedicated pilots.

S403: Perform, according to a spreading code of the received dedicated pilots, despreading on the received dedicated pilots, and obtain dedicated pilots that belong to different data streams.

S404: Obtain a precoding matrix or calculate a composite channel matrix by using the received dedicated pilots and signature sequences sent by the network side, where the composite channel matrix is a product of a channel matrix of all receive antennas of a method executor and a precoding matrix of all data streams of the method executor. A specific calculation method is similar to the process in the second embodiment, and is not repeatedly described here.

Figure 5:
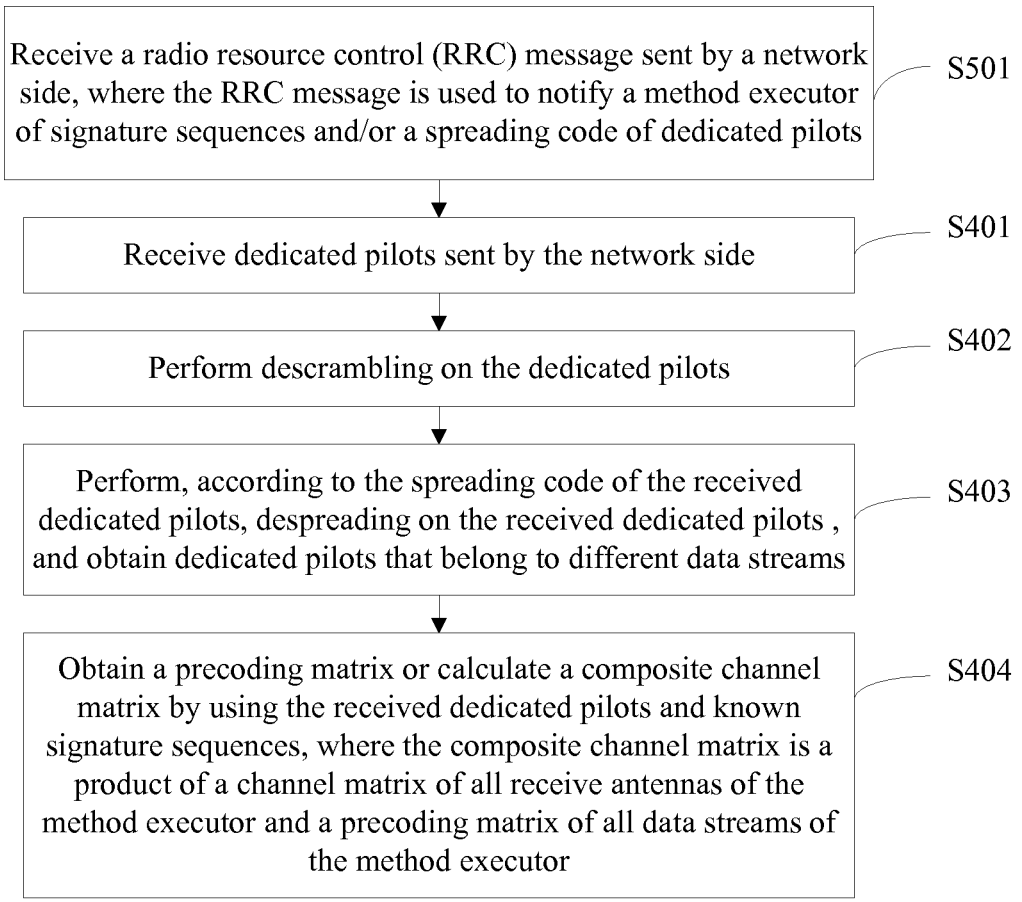
FIG. 5 is a block flowchart of a method for performing estimation by using dedicated pilots according to another embodiment of the present invention.

Further, as shown in FIG. 5, before step S401, that is, receiving dedicated pilots sent by a network side, the method may also include the following step:

S501: Receive a radio resource control (RRC) message sent by a network side, where the RRC message is used to notify a method executor of the signature sequences and/or spreading code of the dedicated pilots.

By using the method for performing estimation by using dedicated pilots provided in the embodiment of the present invention, the precoding matrix can be obtained or the composite channel matrix can be calculated by using the received dedicated pilots and the signature sequences sent by the network side. In this way, multiple signature sequences may be carried on a same spreading code at the network side, and used as dedicated pilots of multiple data streams of multiple UEs, so that the UEs estimate the precoding matrix used by a multi-antenna sender. Therefore, a precoding matrix index of each data stream of each UE does not need to be sent to the UE, which avoids occurrence of circumstances where a UE cannot perform decoding normally in the prior art because a large number of precoding matrix indexes of users cannot be notified at the same time. According to the embodiment of the present invention, network resources are saved, and the number of accessing users is effectively increased. In addition, the dedicated pilot of each data stream of each UE does not need to occupy a dedicated downlink DPCCH. Because each DPCCH needs to consume at least one spreading code, if the dedicated pilot of each data stream of each UE consumes at least one spreading code, the shortage of spreading code resources is caused to get worse. Therefore, carrying the dedicated pilots of multiple data streams of multiple UEs on one spreading code can save code resources and serve more users.

Figure 6:
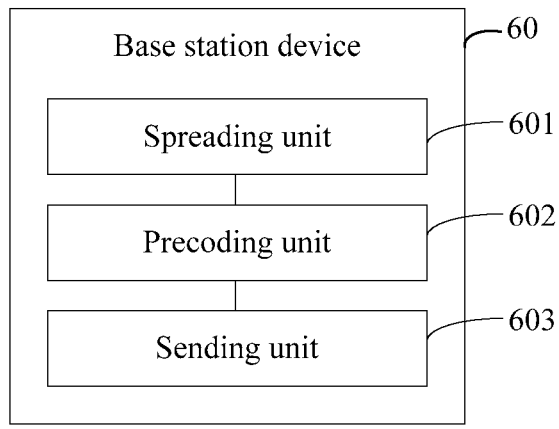
FIG. 6 is a structural block diagram of a base station device according to an embodiment of the present invention.

An embodiment of the present invention provides a base station device 60. As shown in FIG. 6, the base station device 60 includes:

a spreading unit 601, configured to perform spreading on at least two signature sequences by using a spreading code, where each signature sequence of the at least two signature sequences corresponds to at least one user equipment (UE), and is used as a dedicated pilot of at least one data stream of the at least one UE, and the dedicated pilot is used by the UE to perform precoding matrix estimation;

a precoding unit 602, configured to perform precoding on sequences output by the spreading unit 601, where a precoding matrix or a precoding vector, where the precoding matrix or the precoding vector is used in performing the precoding, is the same as a precoding matrix or a precoding vector, where the precoding matrix or the precoding vector is used in performing precoding on data streams corresponding to the signature sequences; and a sending unit 603, configured to send the sequences output by the precoding unit 602 to the UE.

By using the base station device provided in this embodiment of the present invention, multiple signature sequences are carried on a same spreading code, and are used as dedicated pilots of multiple data streams of multiple UEs, so that the UEs estimate a precoding matrix used by a multi-antenna sender. In this way, a precoding matrix index of each data stream of each UE does not need to be sent to the UE, which avoids occurrence of circumstances where a UE cannot perform decoding normally in the prior art because a large number of precoding matrix indexes of users cannot be notified at the same time. According to the embodiment of the present invention, network resources are saved, and the number of accessing users is effectively increased. In addition, the dedicated pilot of each data stream of each UE does not need to occupy a dedicated downlink DPCCH. Because each DPCCH needs to consume at least one spreading code, if the dedicated pilot of each data stream of each UE consumes at least one spreading code, the shortage of spreading code resources is caused to get worse. Therefore, carrying the dedicated pilots of multiple data streams of multiple UEs on one spreading code can save code resources and serve more users.

Figure 7:
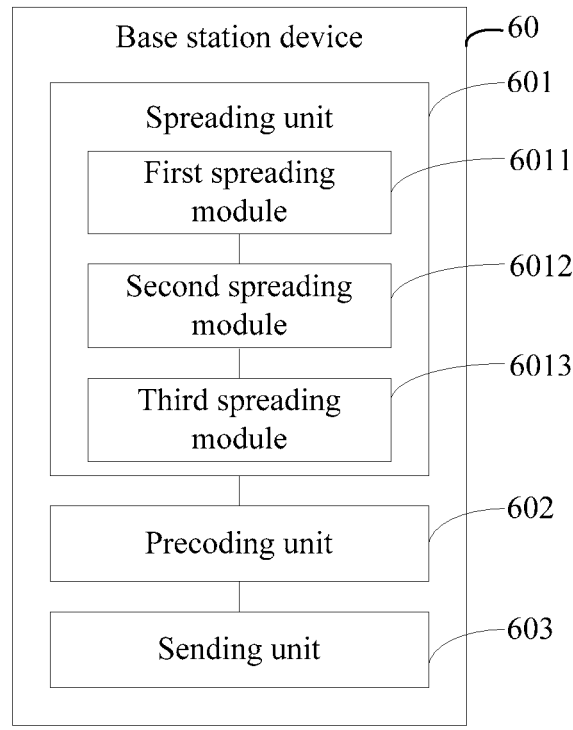
FIG. 7 is a structural block diagram of another base station device according to an embodiment of the present invention.

Further, as shown in FIG. 7, the spreading unit 601 includes:

a first spreading module 6011, configured to perform spreading on at least two signature sequences by using a spreading code, where each signature sequence of the at least two signature sequences corresponds to at least two UEs, and is used as a dedicated pilot of at least one data stream of each UE of the at least two UEs; and a second spreading module 6012, configured to perform spreading on at least two signature sequences by using a spreading code, where each signature sequence of the at least two signature sequences corresponds to at least one UE, and is used as a dedicated pilot of at least two data streams of the at least one UE.

a third spreading module 6013, configured to perform spreading on at least two signature sequences by using a spreading code, where each signature sequence of the at least two signature sequences corresponds to one UE, and is used as a dedicated pilot of a data stream of the one UE;

In this way, through the reusing of the dedicated pilot, dedicated pilot overheads can be further reduced and, the number of accessing users is increased.

In addition, before a NodeB sends precoded dedicated pilots to the UE, the sending unit 603 is further configured to send a radio resource control (RRC) message to the UE, where the RRC message is used to notify the UE of the signature sequences and/or spreading code of the signature sequences.

Figure 8:
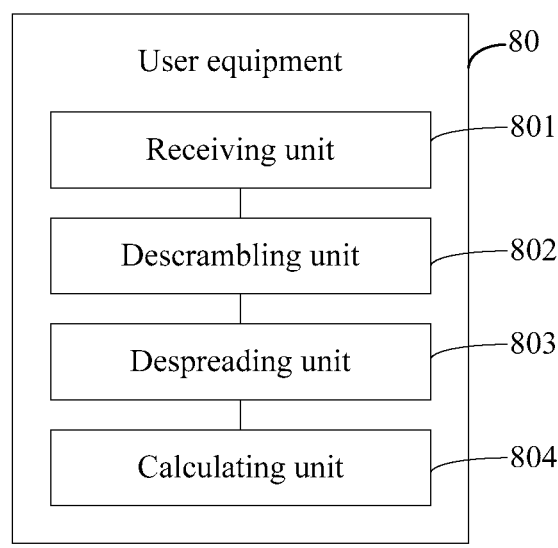
FIG. 8 is a structural block diagram of a user equipment according to an embodiment of the present invention.

An embodiment of the present invention provides a user equipment 80. As shown in FIG. 8, the user equipment 80 includes:

a receiving unit 801, configured to receive dedicated pilots sent by a network side;

a descrambling unit 802, configured to perform descrambling on the dedicated pilots received by the receiving unit 801;

a despreading unit 803, configured to perform, according to a spreading code of the received dedicated pilots, despreading on the received dedicated pilots, and obtain dedicated pilots that belong to different data streams; and a calculating unit 804, configured to obtain a precoding matrix or calculate a composite channel matrix by using the received dedicated pilots and signature sequences sent by the network side, where the composite channel matrix is a product of a channel matrix of all receive antennas of the user equipment and a precoding matrix of all data streams of the user equipment. A specific calculation process is described in the second embodiment, and is not repeatedly described here.

Further, the receiving unit 801 is configured to receive a radio resource control (RRC) message sent by the network side, where the RRC message is used to notify the user equipment of the signature sequences and/or spreading code of the signature sequences.

By using the user equipment provided in this embodiment of the present invention, multiple signature sequences carried on a same spreading code can be received, and are used as dedicated pilots of multiple data streams of multiple UEs, so that a precoding matrix used by a multi-antenna sender is estimated. In this way, a precoding matrix index of each data stream of each UE does not need to be sent to the UE, which avoids occurrence of circumstances where a UE cannot perform decoding normally in the prior art because a large number of precoding matrix indexes of users cannot be notified at the same time. According to the embodiment of the present invention, network resources are saved, and s the number of accessing users is effectively increased. In addition, the dedicated pilot of each data stream of each UE does not need to occupy a dedicated downlink DPCCH. Because each DPCCH needs to consume at least one spreading code, if the dedicated pilot of each data stream of each UE consumes at least one spreading code, the shortage of spreading code resources is caused to get worse. Therefore, carrying the dedicated pilots of multiple data streams of multiple UEs on one spreading code can save code resources and serve more users.

Figure 9:
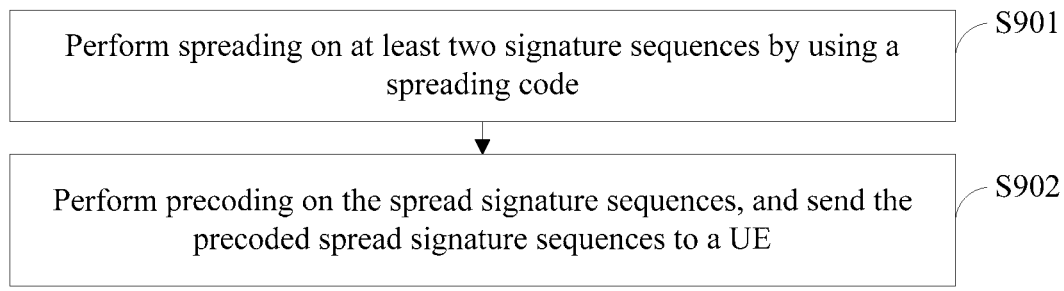
FIG. 9 illustrates a pilot solving method according to an embodiment of the present invention.

An embodiment of the present invention also provides a pilot solving method. As shown in FIG. 9, this embodiment includes:

Step 901: Perform spreading on at least two signature sequences by using a spreading code.

Step 902: Perform precoding on the spread signature sequences, and send the precoded spread signature sequences to a UE.

Each signature sequence of the at least two signature sequences is used as a dedicated pilot of at least one data stream of at least one UE, where the dedicated pilot is used by the UE to perform precoding matrix estimation.

A precoding matrix used in performing the precoding is the same as a precoding matrix used in performing precoding on data streams corresponding to the signature sequences; or a precoding vector used in performing the precoding is the same as a coding vector used in performing precoding on data streams corresponding to the signature sequences.

An executor of this embodiment of the present invention is a network side device. The network side device in this embodiment uses same signature sequences as the dedicated pilots of different data streams of different UEs or different data streams of a same UE. The number of needed resources is smaller than that in sending precoding indexes, which saves network resources.

The foregoing descriptions are merely specific exemplary embodiments of the present invention, but not intended to limit the protection scope of the present invention. Any variation or replacement readily conceivable to those skilled in the art within the technical scope disclosed in the present invention shall fall within the protection scope of the present invention. Therefore, the protection scope of the present invention is subject to the protection scope of the claims.

What is claimed is:

1. A method for performing estimation by using dedicated pilots, comprising:

receiving, by a user equipment (UE), a first set of dedicated pilots sent by a network side;

performing descrambling on the first set of dedicated pilots;

performing, according to a spreading code of the first set of dedicated pilots, despreading on the first set of dedicated pilots, wherein the spreading code is used to implement at least one of the following: (a) performing spreading on at least two signature sequences, wherein each signature sequence of the at least two signature sequences is used as a dedicated pilot of at least one data stream of each UE of at least two UEs; and (b) performing spreading on the at least two signature sequences, wherein each signature sequence of the at least two signature sequences is used as dedicated pilots of at least two data streams of at least one UE;

obtaining a second set of dedicated pilots that belong to different data streams; and obtaining a precoding matrix or calculating a composite channel matrix by using the first set of dedicated pilots and the at least two signature sequences sent by the network side;

wherein the composite channel matrix is a product of a channel matrix of all receive antennas of the UE and a precoding matrix of all the data streams of the UE.

2. The method for performing estimation by using the dedicated pilots according to claim 1, wherein before the receiving dedicated pilots sent by the network side, the method further comprises:

receiving a radio resource control (RRC) message sent by the network side, wherein the RRC message is used to implement at least one of the following: (a) notifying the UE of the at least two signature sequences, and (b) the spreading code of the first set of dedicated pilots.

3. A base station device, comprising:

a spreading unit, configured to perform spreading on at least two signature sequences by using a spreading code, wherein each signature sequence of the at least two signature sequences is used as a dedicated pilot of at least one data stream of at least one user equipment (UE), and the dedicated pilot is used by the at least one UE to perform precoding matrix estimation;

a precoding unit, configured to perform precoding on sequences output by the spreading unit, wherein one of the group consisting of a precoding matrix and a precoding vector which is used in performing the precoding, is the same as another one of the group consisting of a precoding matrix and a precoding vector, which is used to perform the precoding on data streams corresponding to the at least two signature sequences; and a sending unit, configured to send the sequences output by the precoding unit to the at least one UE;

wherein the spreading unit comprises at least one of the following spreading modules:

a first spreading module, configured to perform spreading on the at least two signature sequences by using the spreading code, wherein each signature sequence of the at least two signature sequences is used as a dedicated pilot of at least one data stream of each UE of at least two UEs; and a second spreading module, configured to perform the spreading on the at least two signature sequences by using the spreading code, wherein each signature sequence of the at least two signature sequences is used as dedicated pilots of at least two data streams of the at least one UE.

4. The base station device according to claim 3, wherein the spreading unit further comprises:
a third spreading module, configured to perform spreading on the at least two signature sequences by using the spreading code, wherein each signature sequence of the at least two signature sequences is used as a dedicated pilot of one data stream of one UE of the at least one UE.

5. The base station device according to claim 3, wherein:
the sending unit is further configured to send a radio resource control (RRC) message to the at least one UE, wherein the RRC message is used to implement at least one of the group consisting of: (a) notifying the at least one UE of the at least two signature sequences, and (b) the spreading code of the dedicated pilots.

6. A user equipment (UE), comprising:
a receiving unit, configured to receive dedicated pilots sent by a network side;
a descrambling unit, configured to perform descrambling on the dedicated pilots received by the receiving unit;
a despreading unit, configured to perform, according to a spreading code of the received dedicated pilots, despreading on the received dedicated pilots, and obtain new dedicated pilots that belong to different data streams, wherein the spreading code is used to implement at least one of the group consisting of: (a) performing spreading on at least two signature sequences, wherein each signature sequence of the at least two signature sequences is used as a dedicated pilot of at least one data stream of each UE of at least two UEs; and (b) performing spreading on the at least two signature sequences, wherein each signature sequence of the at least two signature sequences is used as dedicated pilots of at least two data streams of at least one UE; and
a calculating unit, configured to implement at least one of the group consisting of (a) obtaining a precoding matrix, and (b) calculating a composite channel matrix by using the received dedicated pilots and the at least two signature sequences sent by the network side, wherein the composite channel matrix is a product of a channel matrix of all receive antennas of the UE and a precoding matrix of all the data streams of the UE.

7. The user equipment according to claim 6, wherein:
the receiving unit is further configured to receive a radio resource control (RRC) message sent by the network side, wherein the RRC message is used to implement at least one of the group consisting of: (a) notifying the UE of the at least two signature sequences, and (b) spreading code of the dedicated pilots.

* * * * *